(12) United States Patent
Itoh

(10) Patent No.: US 8,660,346 B2
(45) Date of Patent: Feb. 25, 2014

(54) IMAGE PROCESSING APPARATUS, IMAGE PROCESSING METHOD AND COMPUTER READABLE MEDIUM FOR IMAGE PROCESSING

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 686 days.

(21) Appl. No.: 12/542,315

(22) Filed: Aug. 17, 2009

(65) Prior Publication Data
US 2010/0226571 A1   Sep. 9, 2010

(30) Foreign Application Priority Data

Mar. 4, 2009 (JP) ................. 2009-050841

(51) Int. Cl.
*G06K 9/00* (2006.01)
*G06K 9/34* (2006.01)

(52) U.S. Cl.
USPC ............ 382/167; 382/163; 382/164; 382/165

(58) Field of Classification Search
USPC .................. 382/162, 163, 164, 165, 166, 167
See application file for complete search history.

(56) References Cited

U.S. PATENT DOCUMENTS

| 7,324,692 | B2* | 1/2008 | Kanamoto et al. | 382/182 |
| 2003/0142865 | A1* | 7/2003 | Hirota et al. | 382/167 |
| 2006/0188148 | A1* | 8/2006 | Nako et al. | 382/162 |
| 2007/0189615 | A1* | 8/2007 | Liu et al. | 382/232 |
| 2008/0069442 | A1 | 3/2008 | Itoh | |
| 2009/0190830 | A1* | 7/2009 | Hasegawa | 382/165 |
| 2010/0053351 | A1* | 3/2010 | Lukac | 348/222.1 |

FOREIGN PATENT DOCUMENTS

| JP | A-5-61974 | 3/1993 |
| JP | A-2007-249774 | 9/2007 |
| JP | A-2008-65803 | 3/2008 |

\* cited by examiner

*Primary Examiner* — Amir Alavi
*Assistant Examiner* — Kenny Cese
(74) *Attorney, Agent, or Firm* — Oliff PLC

(57) ABSTRACT

An image processing apparatus includes a first calculating section that calculates a non-contour degree for pixel of a processing target image data, a second calculating section that calculates a thin line degree for pixel of the processing target image data, a region extracting section that extracts a thin line or non-contour region based on the non-contour degree and the thin line degree and a color value extracting section. The color value extracting section extracts a color value within a range of a predetermined number of colors based on a color used in the thin line or non-contour region extracted by the region extracting section in the processing target image data.

16 Claims, 11 Drawing Sheets

FIG. 3A

|   |   |   |    |   |
|---|---|---|----|---|
|   | 1 |   | -1 |   |
|   | 1 |   | -1 |   |
|   | 1 |   | -1 |   |
|   |   |   |    |   |

FIG. 3B

|   |    |    |    |   |
|---|----|----|----|---|
|   | 1  | 1  | 1  |   |
|   |    |    |    |   |
|   | -1 | -1 | -1 |   |
|   |    |    |    |   |

FIG. 4A

|   |   |    |   |   |
|---|---|----|---|---|
| 1 |   | -2 |   | 1 |
| 1 |   | -2 |   | 1 |
| 1 |   | -2 |   | 1 |
|   |   |    |   |   |

FIG. 4B

|   | 1  | 1  | 1  |   |
|---|----|----|----|---|
|   |    |    |    |   |
|   | -2 | -2 | -2 |   |
|   |    |    |    |   |
|   | 1  | 1  | 1  |   |

*FIG. 5*

|  |  | NON-CONTOUR DEGREE | |
|---|---|---|---|
|  |  | THRESHOLD 1 > | THRESHOLD 1 ≤ |
| THIN LINE DEGREE | THRESHOLD 2 ≤ | ON | ON |
|  | THRESHOLD 2 > | ON | OFF |

IMAGE PROCESSING APPARATUS, IMAGE PROCESSING METHOD AND COMPUTER READABLE MEDIUM FOR IMAGE PROCESSING

CROSS-REFERENCE TO RELATED APPLICATIONS

This application is based on and claims priority under 35 U.S.C. §119 from Japanese Patent Application No. 2009-050841 filed on Mar. 4, 2009.

BACKGROUND

1. Technical Field

The present invention relates to an image processing apparatus, an image processing method and a computer readable medium for image processing.

2. Related Art

Recently, there has been carried out a color limitation processing for reducing the number of colors used in an image. By the color limitation processing, there are reduced various noises or irregularities contained in an image, for example, a printing irregularity of a document or a scan noise made in a reading operation in the case in which a document image is read by an image reading apparatus and a handwriting irregularity in the case in which a handwritten part is present. In the case in which an image is compressed, moreover, a compression noise is reduced and a compressibility is enhanced.

SUMMARY

According to an aspect of the invention, there is provided an image processing apparatus including:

a first calculating section that calculates a non-contour degree for pixel of a processing target image data, a second calculating section that calculates a thin line degree for pixel of the processing target image data, a region extracting section that extracts a thin line or non-contour region based on the non-contour degree and the thin line degree, and a first color value extracting section that extracts a color value within a range of a predetermined number of colors based on a color used in the thin line or non-contour region extracted by the region extracting section in the processing target image data.

BRIEF DESCRIPTION OF THE DRAWINGS

Exemplary embodiments of the present invention will be described in detail based on the following figures, wherein:

FIGS. 3A and 3B are explanatory diagrams showing an example of a primary differential filter to be used for calculating a non-contour degree in a non-contour degree calculating portion 11;

FIGS. 4A and 4B are explanatory diagrams showing an example of a secondary differential filter to be used for calculating a thin line degree in a thin line degree calculating portion 12;

FIG. 5 is an explanatory diagram showing an example of a decision table in a region extracting portion 13;

DETAILED DESCRIPTION (First Exemplary Embodiment)

Figure 1:
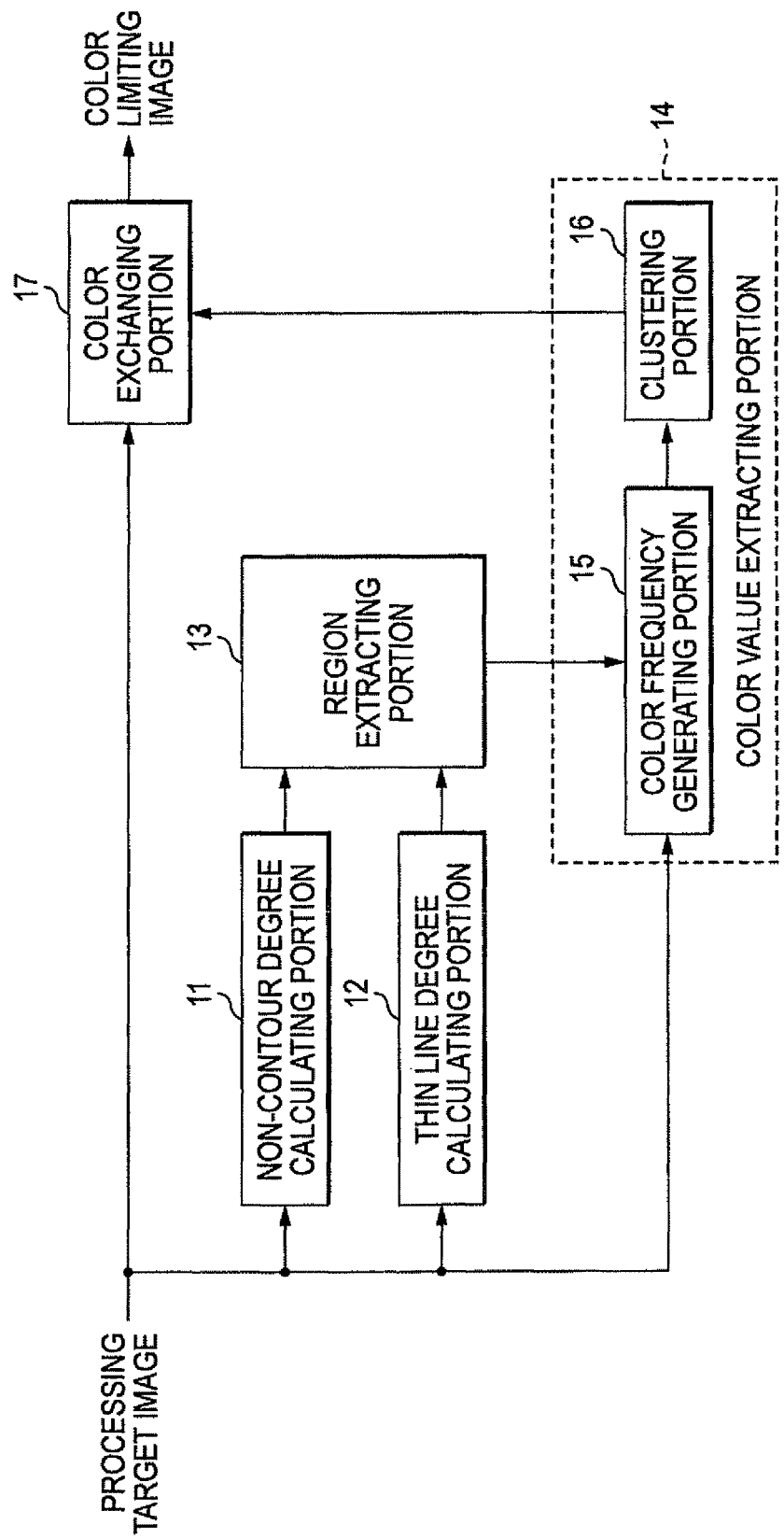
FIG. 1 is a diagram showing a structure according to a first exemplary embodiment of the invention.

FIG. 1 is a diagram showing a structure according to a first exemplary embodiment of the invention. In FIG. 1, 11 denotes a non-contour degree calculating portion, 12 denotes a thin line degree calculating portion, 13 denotes a region extracting portion, 14 denotes a color value extracting portion, 15 denotes a color frequency generating portion, 16 denotes a clustering portion, and 17 denotes a color exchanging portion. Any processing target image may be used, and examples of the processing target image include an image obtained by reading a document through an image reading apparatus, an image obtained by reading a document having a printing irregularity, an image having a scan noise in a reading operation, and an image having a handwritten irregularity in the case in which a handwritten part is present.

The non-contour degree calculating portion 11 calculates a non-contour degree for at least one pixel of the processing target image. For the non-contour degree calculating portion 11, it is preferable to use a known contour extracting filter, for example. It is preferable to calculate a non-contour degree by integrating results obtained by using a primary differential filter in some directions, for example.

The thin line degree calculating portion 12 calculates a thin line degree for at least one pixel of the processing target image. For the thin line degree calculating portion 12, it is preferable to use a known line width detecting filter, for example. It is preferable to calculate a thin line degree by integrating results obtained by using a secondary differential filter in some directions, for example. It is preferable to predetermine a line width of a thin line. For example, it is preferable to change a size of a filter depending on the line width.

The region extracting portion 13 extracts a thin line or non-contour region based on the non-contour degree calculated by the non-contour degree calculating portion 11 and the thin line degree calculated by the thin line degree calculating portion 12.

The color value extracting portion 14 extracts a color value within a range of a predetermined number of colors based on a color used in the thin line or non-contour region extracted by the region extracting portion 13 in the processing target image. In the example, the color value extracting portion 14 is constituted to include the color frequency generating portion 15 and the clustering portion 16. As a matter of course, another structure maybe employed for the color value extracting portion 14.

The color frequency generating portion 15 generates a frequency distribution based on the color value which is used in the thin line and non-contour regions extracted by the region extracting portion 13.

The clustering portion 16 carries out a clustering processing based on the frequency distribution of the color value generated by the color frequency generating portion 15, and performs an aggregation into the color value within the range of the predetermined number of colors or selects any of the aggregated color values within the range of the predetermined number of colors.

The color exchanging portion 17 exchanges a color of the processing target image into the color value extracted by the color value extracting portion 14. Consequently, the color in the processing target image is converted into an image for which at least the predetermined number of colors are used.

With the structure illustrated in FIG. 1, there is shown an example in which a color limitation processing and previous processings thereto are executed for the processing target image by the color exchanging portion 17. However, it is also possible to employ a structure in which the color exchanging portion 17 is not provided but the color value extracted by the color value extracting portion 14 is output.

Figure 2:
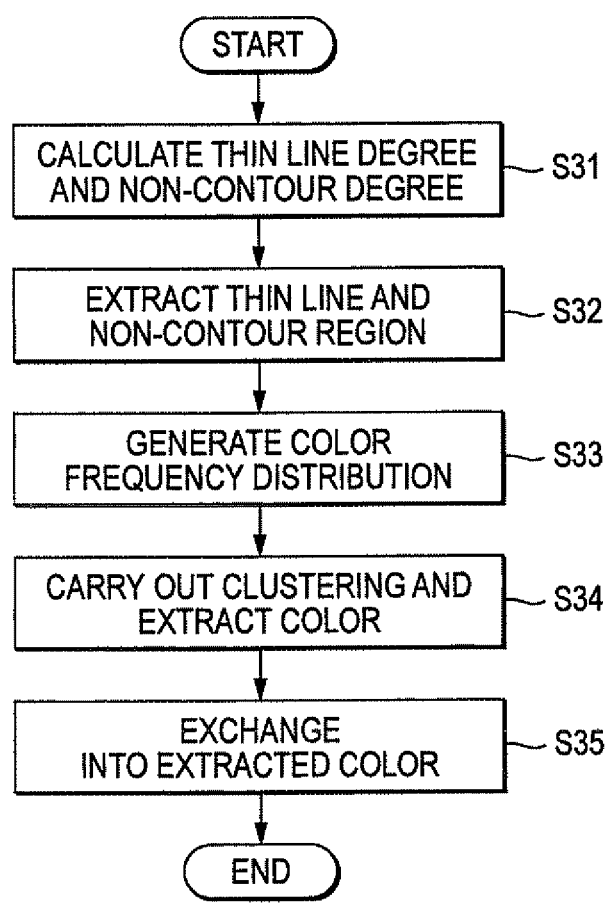
FIG. 2 is a flowchart showing an example of an operation according to the first exemplary embodiment of the invention.

An example of an operation according to the first exemplary embodiment of the invention will be described with reference to a specific example. FIG. 2 is a flowchart showing an example of the operation according to the first exemplary embodiment of the invention. At S31, the non-contour degree calculating portion 11 and the thin line degree calculating portion 12 calculate a non-contour degree and a thin line degree respectively for at least one pixel of the processing target image.

FIGS. 3A and 3B are explanatory diagrams showing an example of the primary differential filter to be used for calculating a non-contour degree in the non-contour degree calculating portion 11. In the example of the primary differential filter shown in FIGS. 3A and 3B, contours in different directions from each other by 90 degrees are detected. Absolute values of values calculated by the respective primary differential filters are obtained and one of the absolute values which is greater is selected and is set to be a non-contour degree in a central pixel (a noted pixel) of the respective primary differential filters. The non-contour degree in the example indicates that the noted pixel has a greater color difference from surrounding pixels and a higher contour degree with a greater numeric value and has a smaller color difference from the surrounding pixels and a high flatness with a smaller numeric value.

FIGS. 4A and 4B are explanatory diagrams showing an example of a secondary differential filter to be used for calculating the thin line degree by the thin line degree calculating portion 12. In the example of the secondary differential filter shown in FIGS. 4A and 4B, thin lines in different directions from each other by 90 degrees are detected. Absolute values of values calculated by the respective secondary differential filters are obtained and one of the absolute values which is greater is selected and is set to be a thin line degree in a central pixel (a noted pixel) of the respective secondary differential filters. The thin line degree in the example indicates that the noted pixel has a thinner line with a greater numeric value.

It is preferable to execute the calculation of the non-contour degree through the primary differential filter and the calculation of the thin line degree through the secondary differential filter for each color component of the processing target image, for example. In the case in which the processing target image has color components of R (red), G (green) and B (blue), non-contour degrees and thin line degrees are calculated for the color components of R, G and B, respectively.

Although the non-contour degree and the thin line degree are calculated by setting a single pixel as a unit, it is a matter of course that the non-contour degree and the thin line degree may be calculated by setting a plurality of pixels as a unit. In addition to a method using the primary differential filter and the secondary differential filter, it is also possible to calculate the non-contour degree and the thin line degree from a color difference between a noted pixel (group) and surrounding pixels. As a matter of course, it is also possible to use different methods for the calculation of the non-contour degree and that of the thin line degree.

Returning to FIG. 2, at S32, the region extracting portion 13 extracts a thin line or non-contour region based on the non-contour degree calculated by the non-contour degree calculating portion 11 and the thin line degree calculated by the thin line degree calculating portion 12. FIG. 5 is an explanatory diagram showing an example of a decision table in the region extracting portion 13. Description will be given to an example of the processing of the region extracting portion 13. First of all, the non-contour degree calculated by the non-contour degree calculating portion 11 is compared with a preset threshold (a threshold 1) of the non-contour degree, and furthermore, the thin line degree calculated by the thin line degree calculating portion 12 is compared with a preset threshold (a threshold 2) of the thin line degree. From the results of the comparison, it is decided whether a pixel is present in a region to be extracted based on the decision table shown in FIG. 5, for example.

In the example shown in FIG. 5, it is assumed that OFF is set and the region is not extracted if the non-contour degree is equal to or higher than the threshold 1 and the thin line degree is lower than the threshold 2 and ON is set and the region is extracted in the other cases. The case in which the non-contour degree is equal to or higher than the threshold 1 and the thin line degree is lower than the threshold 2 indicates the case in which a decision of the contour part is made and the contour is not a thin line. Accordingly, the non-contour region which is not the contour part and a region to be the contour part of a thin line are extracting targets.

In the case in which the non-contour degree and the thin line degree are calculated for each color component, the decision is made for each color component. If a decision of ON is made for every color component, it is preferable to make the decision of the pixel as ON and to set the pixel to be an extracting target.

At S33 in FIG. 2, the color frequency generating portion 15 of the color value extracting portion 14 counts the number of pixels every used color value for the region extracted as the processing target by the region extracting portion 13, and generates a color value frequency distribution. For example, if the processing target image is constituted by the color components of R, G and B, a three-dimensional color value frequency distribution with R, G and B set to be axes is obtained.

At S34, the clustering portion 16 of the color value extracting portion 14 carries out a clustering processing based on the color value frequency distribution generated by the color frequency generating portion 15 and carries out an aggregation into a color value within a range of a predetermined number of colors or selects any of the aggregated color values within the range of the predetermined number of colors. For the processings of the color value extracting portion 14 which are to be executed at the S33 and S34, it is preferable to use a well-known technique.

At S35, the color exchanging portion 17 exchanges a color of each pixel to be a processing target image into the color value extracted by the color value extracting portion 14. It is sufficient that the processing is carried out by a well-known method. Consequently, a color in the processing target image is converted into an image for which at least a predetermined number of colors are used, and a color limitation processing is carried out over the processing target image. It is also possible to employ a structure in which the processing of the S35 is not executed but a color value which is selected at the S34 and is equal to or smaller than the predetermined number of colors is acquired and the processing is then ended.

(Second Exemplary Embodiment)

Figure 6:
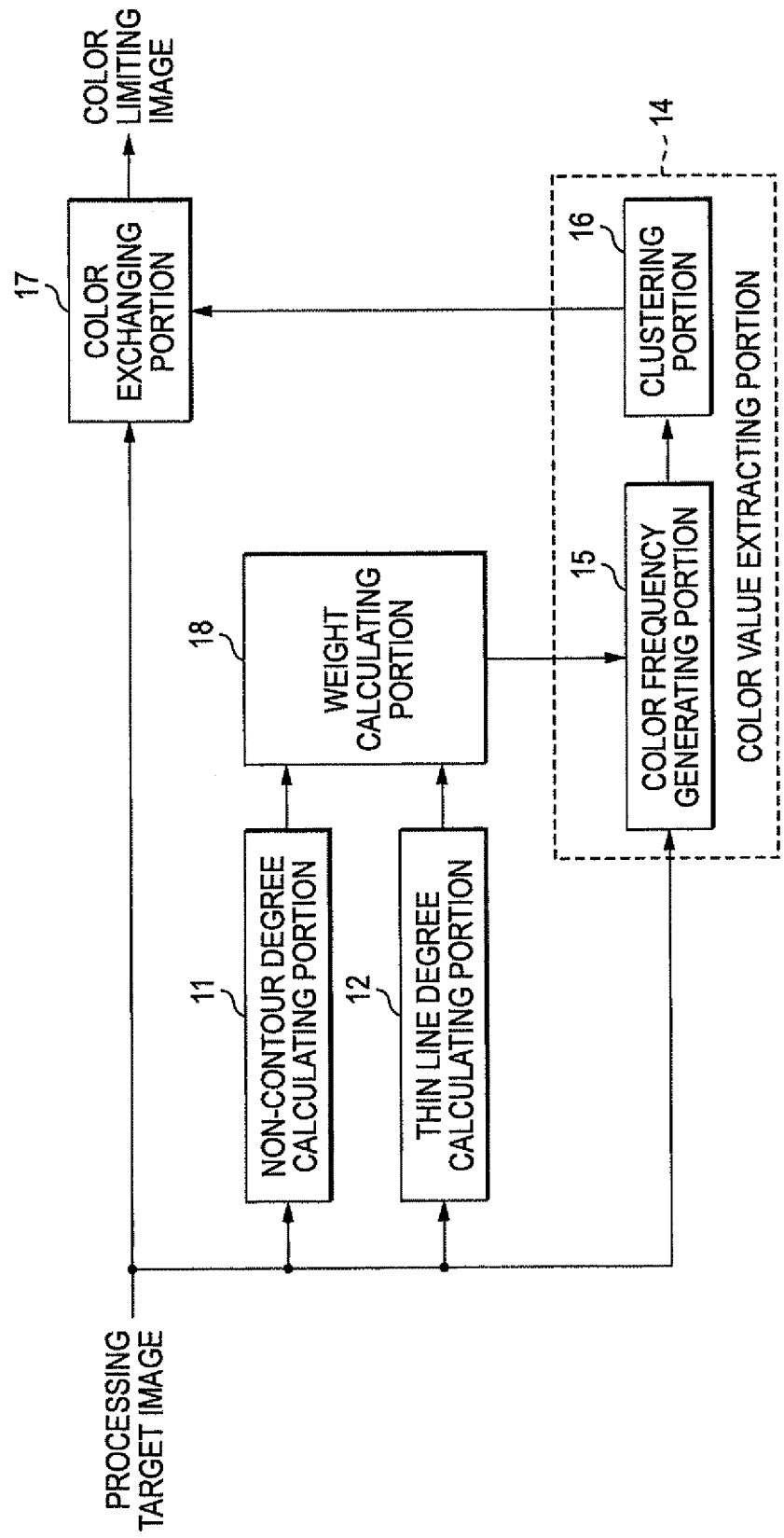
FIG. 6 is a diagram showing a structure according to a second exemplary embodiment of the invention.

FIG. 6 is a diagram showing a structure according to a second exemplary embodiment of the invention. In FIG. 6, 18 denotes a weight calculating portion. In the first exemplary embodiment, the color frequency distribution is to be calculated for the thin line or non-contour region by the region extracting portion 13 and the color frequency generating portion 15 generates the color frequency distribution, thereby preventing the color of the contour part from being extracted. The second exemplary embodiment shows an example in which weighting is carried out to prevent a color of a contour part from being extracted.

The weight calculating portion 18 calculates a weight in a calculation of a frequency value based on a non-contour degree calculated by a non-contour degree calculating portion 11 and a thin line degree calculated by a thin line degree calculating portion 12. For example, preferably, a first weight is set if the non-contour degree is lower than a preset threshold and a second weight which is smaller than the first weight is set if the non-contour degree is equal to or higher than the threshold, and a third weight is set if the thin line degree is equal to or higher than a preset threshold and a fourth weight which is smaller than the third weight is set if the thin line degree is lower than the threshold. Consequently, the weights of the non-contour part and the thin line part are increased. For example, if the thin line region is set to be a first priority region and the non-contour region is set to be a priority region, and a color value is thus extracted, it is preferable to set the third weight to be greater than the first weight. Consequently, a color value attaching an importance to a color of a thin line is extracted. In order to attach an importance, it is preferable to regulate the setting of the first and third weights. The second and fourth weights are set to be smaller than the first and third weights. For example, they may be set to be zero, for example.

Alternatively, a weight function setting a non-contour degree and a thin line degree as coefficients may be used to calculate a weight. For example, it is preferable to calculate a weight W, $W=\alpha \cdot S+\beta(N\max-N)$ wherein the non-contour degree is represented by N, the thin line degree is represented by S and the weight is represented by W. $\alpha$ and $\beta$ represent coefficients for setting degrees of an importance of the thin line and the non-contour. If $\alpha>\beta$ is set, for example, a weight attaching an importance to a color of the thin line is obtained. Moreover, Nmax represents a maximum value of the non-contour degree. Herein, the non-contour degree N and the thin line degree S have non-negative values. As a matter of course, the weight function is illustrative and various changes can be made.

The weight is calculated for at least one pixel of the processing target image by the weight calculating portion 18.

In a color value extracting portion 14 according to the second exemplary embodiment, the color frequency generating portion 15 generates a color frequency value subjected to weighting by the weight calculated through the weight calculating portion 18 for a color used in a processing target image and a clustering portion 16 carries out clustering based on a distribution of the color frequency value subjected to the weighting, thereby extracting a color value within a range of a predetermined number of colors.

The color frequency generating portion 15 generates the color frequency distribution based on the color value used in the processing target image, and carries out the weighting in accordance with the weight calculated by the weight calculating portion 18, thereby executing an addition in the addition of a frequency. For example, if a weight of a thin line region has a greater value than any other weight, a frequency of a color of a thin line is higher than any other color also in the color frequency distribution or a frequency value indicates a great value even if the number of pixels is smaller than a total. As compared with the case in which the weighting is not carried out, therefore, a selection is performed by the clustering portion 16 so that the color of the thin line is apt to remain.

Figure 7:
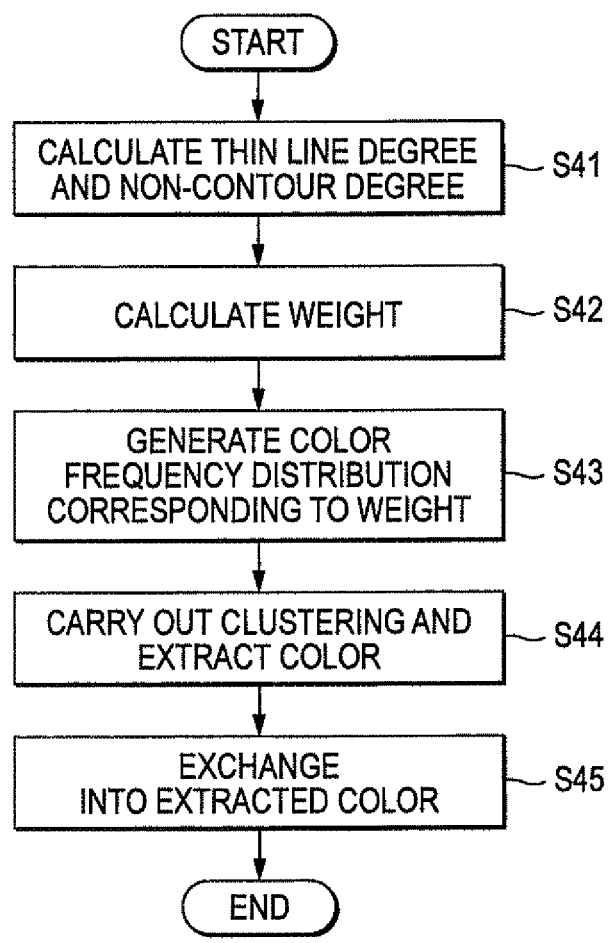
FIG. 7 is a flowchart showing an example of an operation according to the second exemplary embodiment of the invention.

FIG. 7 is a flowchart showing an example of the operation according to the second exemplary embodiment of the invention. At S41, the non-contour degree calculating portion 11 and the thin line degree calculating portion 12 calculate a non-contour degree and a thin line degree for at least one pixel of the processing target image, respectively. Referring to the calculation of the non-contour degree in the non-contour degree calculating portion 11, for example, it is preferable that any of absolute values of values obtained by using the primary differential filter shown in FIGS. 3A and 3B for each color component which is the greatest should be set to be a non-contour degree of a noted pixel (group). Referring to the calculation of the thin line degree in the thin line degree calculating portion 12, for example, it is preferable that any of absolute values of values obtained by using the secondary differential filter shown in FIGS. 4A and 4B for each color component which is the greatest should be set to be a thin line degree of the noted pixel (group). As a matter of course, other methods may be used.

At S42, the weight calculating portion 18 calculates a weight based on the non-contour degree calculated by the non-contour degree calculating portion 11 and the thin line degree calculated by the thin line degree calculating portion 12. Referring to the weight, for example, it is also possible to classify a thin line region, a non-contour region and the other regions into the most important region, an important region and non-important regions respectively, thereby calculating a weight corresponding to each of the regions. Alternatively, it is also possible to calculate the weight W from the non-contour degree N and the thin line degree S by using the weight function.

At S43, the color frequency generating portion 15 of the color value extracting portion 14 carries out weighting by the weight calculated through the weight calculating portion 18 to perform an addition, thereby generating a color value frequency distribution when counting the number of pixels for each color value in a processing target image.

At S44, the clustering portion 16 of the color value extracting portion 14 carries out a clustering processing based on the color value frequency distribution generated by the color frequency generating portion 15 and performs an aggregation into a color value within a range of a predetermined number of colors or selects any of the aggregated color values within the range of the predetermined number of colors. The color frequency generating portion 15 carries out the weighting when generating the color frequency distribution. Therefore, a frequency value of a color subjected to great weighting, for example, a color of a thin line or a non-contour part is increased, and there is a tendency that an aggregation into the color values is carried out through the clustering. Accordingly, the color value of the thin line or non-contour part is extracted.

At S45, a color exchanging portion 17 exchanges a color of each pixel to be a processing target image into the color value extracted by the color value extracting portion 14. It is also possible to employ a structure in which the processing of the S45 is not executed but a color value which is selected at the S44 and is equal to or smaller than the predetermined number of colors is acquired and the processing is then ended.

(Third Exemplary Embodiment)

Figure 8:
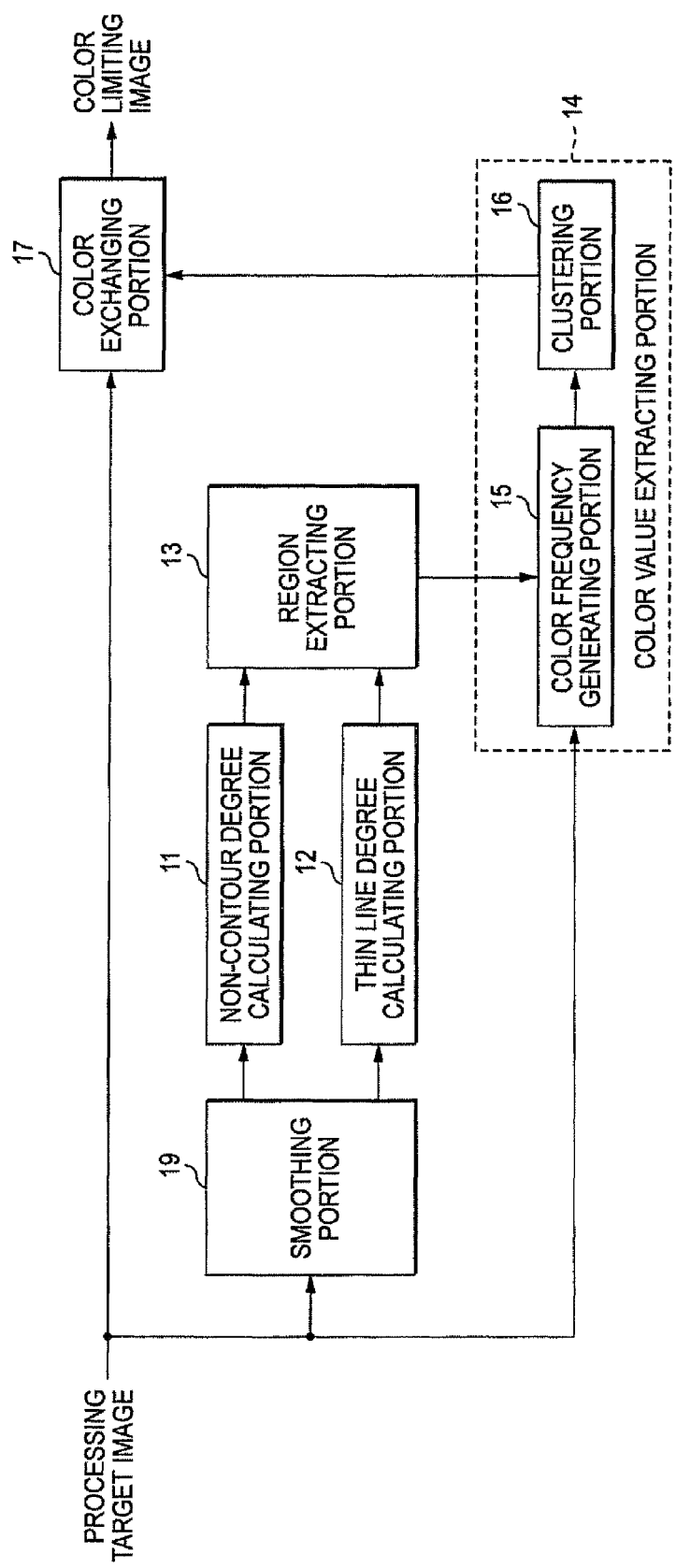
FIG. 8 is a diagram showing a structure according to a third exemplary embodiment of the invention.

FIG. 8 is a diagram showing a structure according to a third exemplary embodiment of the invention. In FIG. 8, 19 denotes a smoothing portion. The smoothing portion 19 carries out a smoothing processing while keeping a contour for a processing target image. By the smoothing processing, a color of a non-contour region is flattened and a color difference made by a color irregularity or offsetting is thus reduced more greatly than that before the processing.

A non-contour degree calculating portion 11 and a thin line degree calculating portion 12 calculate a non-contour degree and a thin line degree respectively by setting, as a processing target, a processing target image subjected to the smoothing processing through the smoothing portion 19. By the smoothing processing carried out by the smoothing portion 19, a non-contour degree in a non-contour part is lower than that in the case in which the smoothing processing is not executed and a contour part is kept in the smoothing portion 19. Therefore, the non-contour degree is calculated in the same manner as in the case in which the smoothing processing is not carried out.

Figure 9:
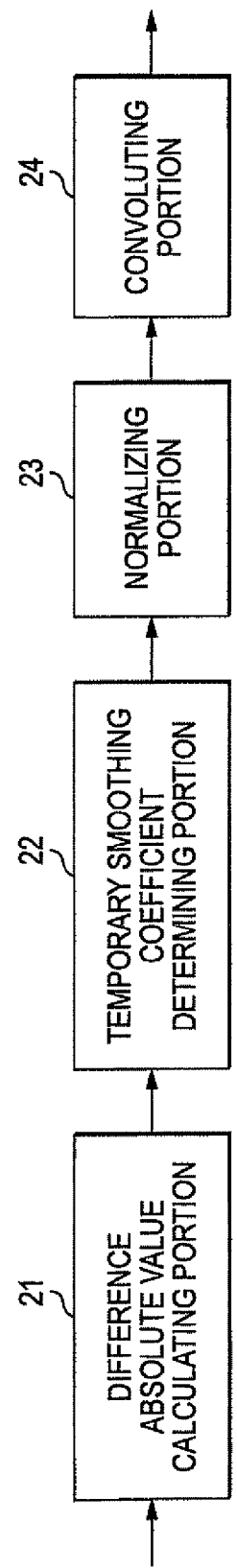
FIG. 9 is a diagram showing a structure according to an example of a smoothing portion.

FIG. 9 is a diagram showing a structure according to an example of the smoothing portion. In FIG. 9, 21 denotes a difference absolute value calculating portion, 22 denotes a temporary smoothing coefficient determining portion, 23 denotes a normalizing portion, and 24 denotes a convoluting portion. The difference absolute value calculating portion 21 sets a processing region having a predetermined size using, as a center, a noted pixel to be a target of the smoothing processing and calculates an absolute value $(Aj=|Vi-Vj|)$ of a difference between a value of the noted pixel (which is represented by Vi) and a value of the other pixel (which is represented by Vj) in the processing region.

The temporary smoothing coefficient determining portion 22 temporarily determines a smoothing coefficient (Cj) corresponding to each pixel in the processing region. As a method of temporarily determining the smoothing coefficient Cj, a certain monotone decreasing function f is set and the smoothing coefficient Cj is temporarily determined in accordance with $Cj=f(Aj)$. The function f is the monotone decreasing function and the absolute value of the difference in the contour part is greater than that in the non-contour part. Referring to the pixel of the contour part, therefore, the smoothing coefficient Cj has a smaller value than that of the non-contour part. Accordingly, an influence on the noted pixel for the pixel of the contour part is smaller than that in the non-contour part. To the contrary, the absolute value of the difference is smaller in the pixel of the non-contour part than that in the contour part. Therefore, the smoothing coefficient Cj has a great value so that the smoothing effect is increased. For the monotone decreasing function f, it is preferable to apply various functions, and simply, a linear function of $Cj=1-(1/\max(Aj))\cdot Aj$, at least a secondary monotone decreasing function and an exponential monotone deceasing function, for example. In the equation, $\max(Aj)$ represents a maximum value of Aj.

The normalizing portion 23 normalizes the smoothing coefficient Cj determined temporarily by the temporary smoothing coefficient determining portion 22. In other words, a calculation is carried out to obtain a sum of the smoothing coefficients Cj in the processing region which is one. More specifically, in the case in which the smoothing coefficient obtained after the normalization is represented by Cj', it is preferable to obtain the sum in accordance with $Cj'=Cj/\Sigma Cj$. The normalization is based on the fact that a smoothing processing is generally a filter processing setting the sum of the smoothing coefficients to be one.

The convoluting portion 24 executes a so-called convolution by using each pixel value in the processing region and the normalized smoothing coefficient obtained by the normalizing portion 23. The convolution is carried out by multiplying each pixel value in the processing region by the normalized smoothing coefficient obtained by the normalizing portion 23 and calculating a total sum. More specifically, in the case in which a value of a noted pixel after the calculation is represented by Vi', it is preferable to execute the calculation in accordance with $Vi'=\Sigma Cj'\cdot Vj$.

Thus, the smoothing portion 19 determines the smoothing coefficient corresponding to an image and sets the smoothing coefficient to be smaller when an absolute value of a difference between the pixel values is greater. Therefore, a contour is kept in a contour region and the smoothing processing is carried out more greatly in a flatter region in a non-contour region. As a matter of course, the smoothing portion 19 is not restricted to the structure shown in FIG. 9 but a smoothing processing keeping the other contours may be utilized.

With the structure illustrated in FIG. 8, there is shown the example in which the smoothing portion 19 is provided in the structure according to the first exemplary embodiment in FIG. 1. In the structure according to the second exemplary embodiment shown in FIG. 6, however, the smoothing portion 19 may be provided, and the non-contour degree calculating portion 11 and the thin line degree calculating portion 12 may receive a processing target image subjected to the smoothing processing in the smoothing portion 19.

(Fourth Exemplary Embodiment)

Figure 10:
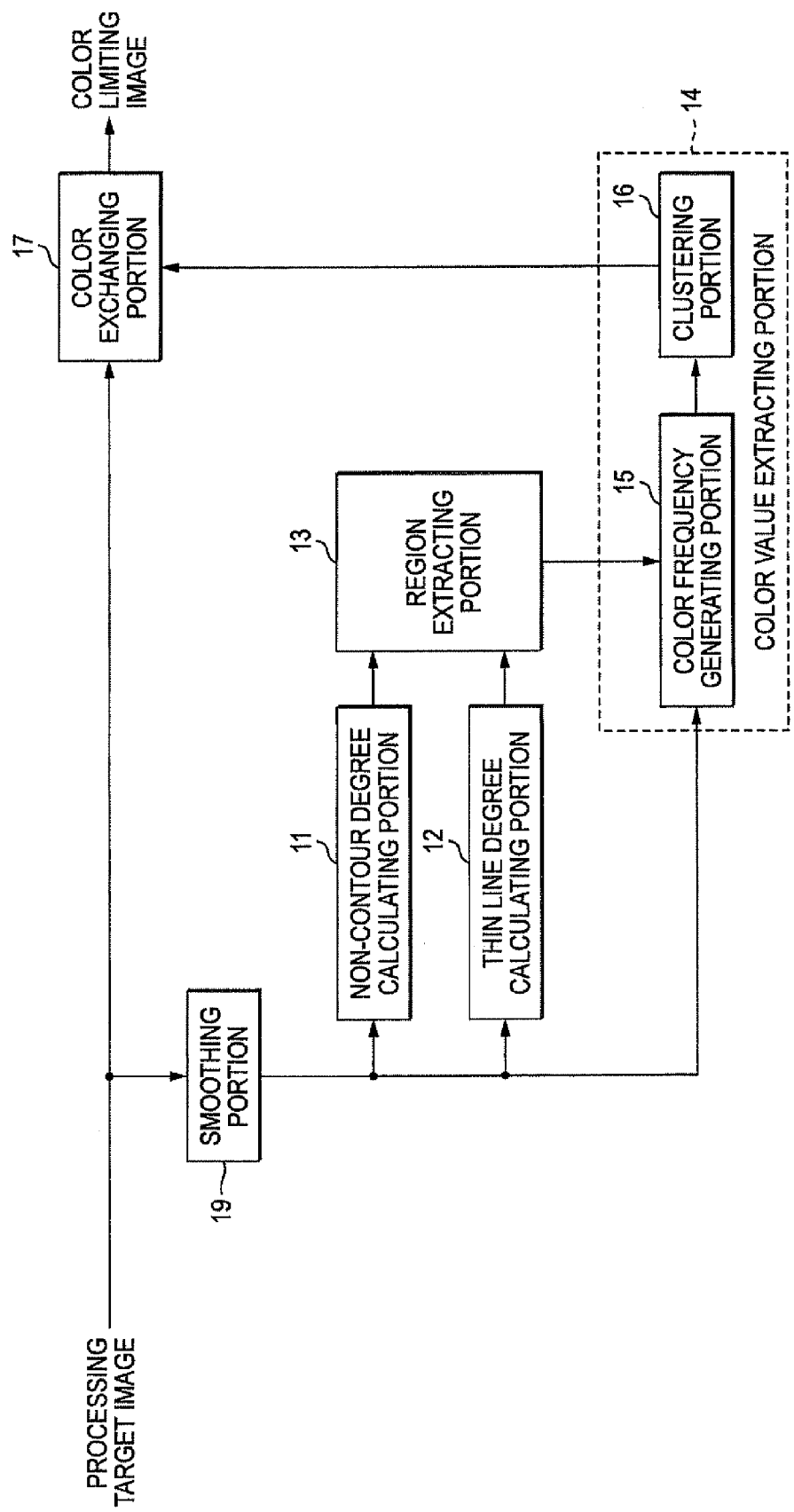
FIG. 10 is a diagram showing a structure according to a fourth exemplary embodiment of the invention.

FIG. 10 is a diagram showing a structure according to a fourth exemplary embodiment of the invention. In the fourth exemplary embodiment, a color value extracting portion 14 also receives a processing target image subjected to a smoothing processing through a smoothing portion 19 together with a non-contour degree calculating portion 11 and a thin line degree calculating portion 12. The color value extracting portion 14 extracts a color value within a range of a predetermined number of colors based on the processing target image subjected to the smoothing processing by the smoothing portion 19. The smoothing processing is carried out. Therefore, a variation in a color of a non-contour region in a color frequency distribution generated by a color frequency generating portion 15 of the color value extracting portion 14 is smaller than that in the case in which the smoothing processing is not carried out. For this reason, a color of the non-contour region is selected more accurately in the case in which the smoothing processing is carried out than that in the case in which the smoothing processing is not carried out.

The non-contour degree calculating portion 11 and the thin line degree calculating portion 12 calculate a non-contour degree and a thin line degree by setting, as a processing target, the processing target image subjected to the smoothing processing through the smoothing portion 19. By the smoothing processing executed through the smoothing portion 19, the non-contour degree of a non-contour part is reduced more greatly than that in the case in which the smoothing processing is not carried out, and the non-contour degree is calculated in a contour part in the same manner as in the case in which the smoothing processing is not carried out because a contour is kept in the smoothing portion 19.

With the structure illustrated in FIG. 10, there is shown the example in which the smoothing portion 19 is provided in the structure according to the first exemplary embodiment illustrated in FIG. 1. In the structure according to the second exemplary embodiment shown in FIG. 6, however, the smoothing portion 19 may be provided, and the non-contour degree calculating portion 11, the thin line degree calculating portion 12 and the color value extracting portion 14 may receive the processing target image subjected to the smoothing processing by the smoothing portion 19.

(Fifth Exemplary Embodiment)

Figure 11:
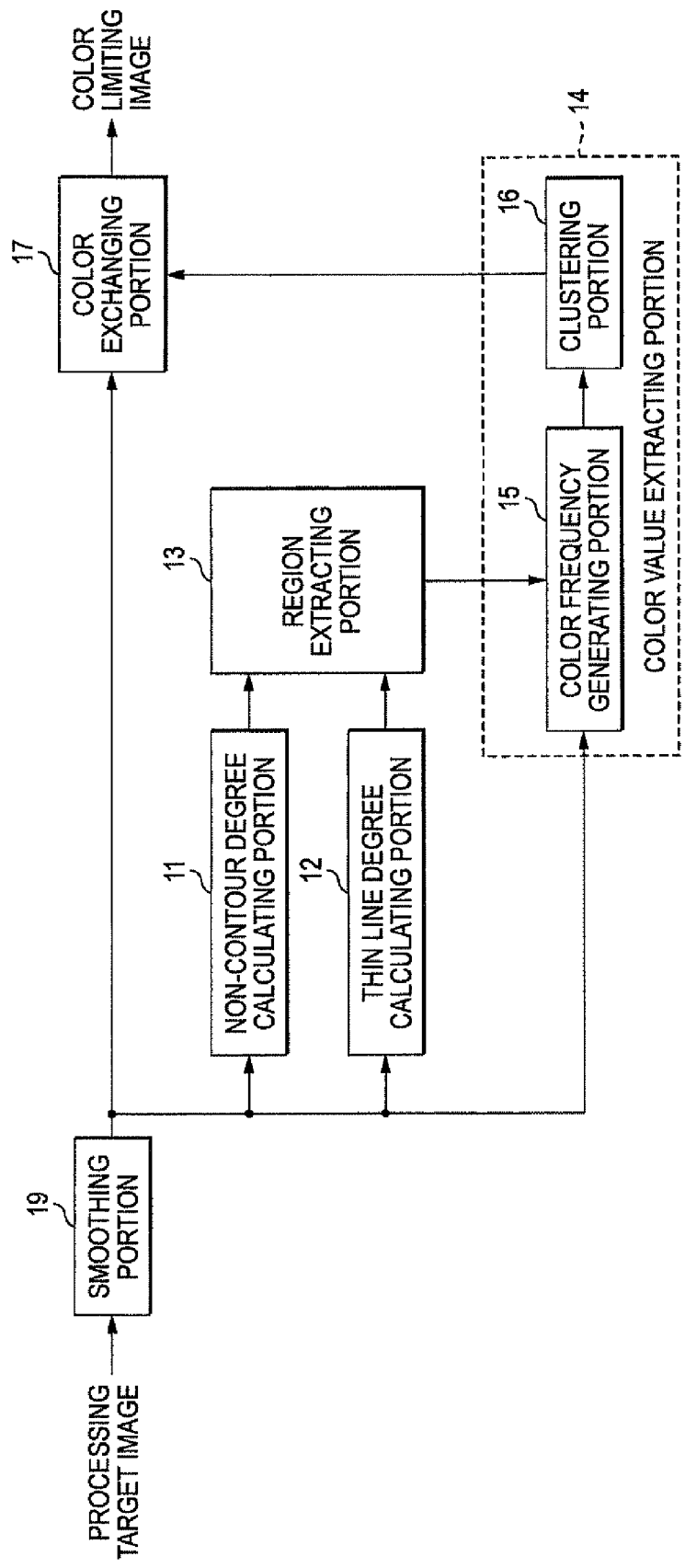
FIG. 11 is a diagram showing a structure according to a fifth exemplary embodiment of the invention.

FIG. 11 is a diagram showing a structure according to a fifth exemplary embodiment of the invention. In the fifth exemplary embodiment, a color exchanging portion 17 also receives a processing target image subjected to a smoothing processing through a smoothing portion 19 together with a non-contour degree calculating portion 11, a thin line degree calculating portion 12 and a color value extracting portion 14. The color exchanging portion 17 exchanges a color of the processing target image subjected to the smoothing processing through the smoothing portion 19 into a color value extracted by the color value extracting portion 14. A variation in a color in a non-contour region is reduced by the smoothing processing. Therefore, a wrong exchange, for example, an exchange into a partially different color in a flat color region is reduced more greatly than that in the case in which the smoothing processing is not carried out.

The non-contour degree calculating portion 11 and the thin line degree calculating portion 12 calculate a non-contour degree and a thin line degree respectively by setting, as a processing target, a processing target pixel subjected to the smoothing processing through the smoothing portion 19. By the smoothing processing executed through the smoothing portion 19, a non-contour degree in a non-contour part is lower than that in the case in which the smoothing processing is not carried out, and the non-contour degree is calculated in a contour part in the same manner as in the case in which the smoothing processing is not carried out because a contour is kept in the smoothing portion 19.

Moreover, the color value extracting portion 14 also extracts a color value within a range of a predetermined number of colors based on the processing target image subjected to the smoothing processing by the smoothing portion 19. The smoothing processing is carried out. Therefore, a variation in a color of a non-contour region in a color frequency distribution generated by a color frequency generating portion 15 of the color value extracting portion 14 is smaller than that in the case in which the smoothing processing is not carried out. For this reason, a color of the non-contour region is selected more accurately in the case in which the smoothing processing is carried out than that in the case in which the smoothing processing is not carried out.

With the structure illustrated in FIG. 11, there is shown the example in which the smoothing portion 19 is provided in the structure according to the first exemplary embodiment illustrated in FIG. 1. In the structure according to the second exemplary embodiment shown in FIG. 6, however, the smoothing portion 19 may be provided, and the non-contour degree calculating portion 11, the thin line degree calculating portion 12, the color value extracting portion 14 and the color exchanging portion 17 may receive the processing target image subjected to the smoothing processing by the smoothing portion 19.

Figure 12:
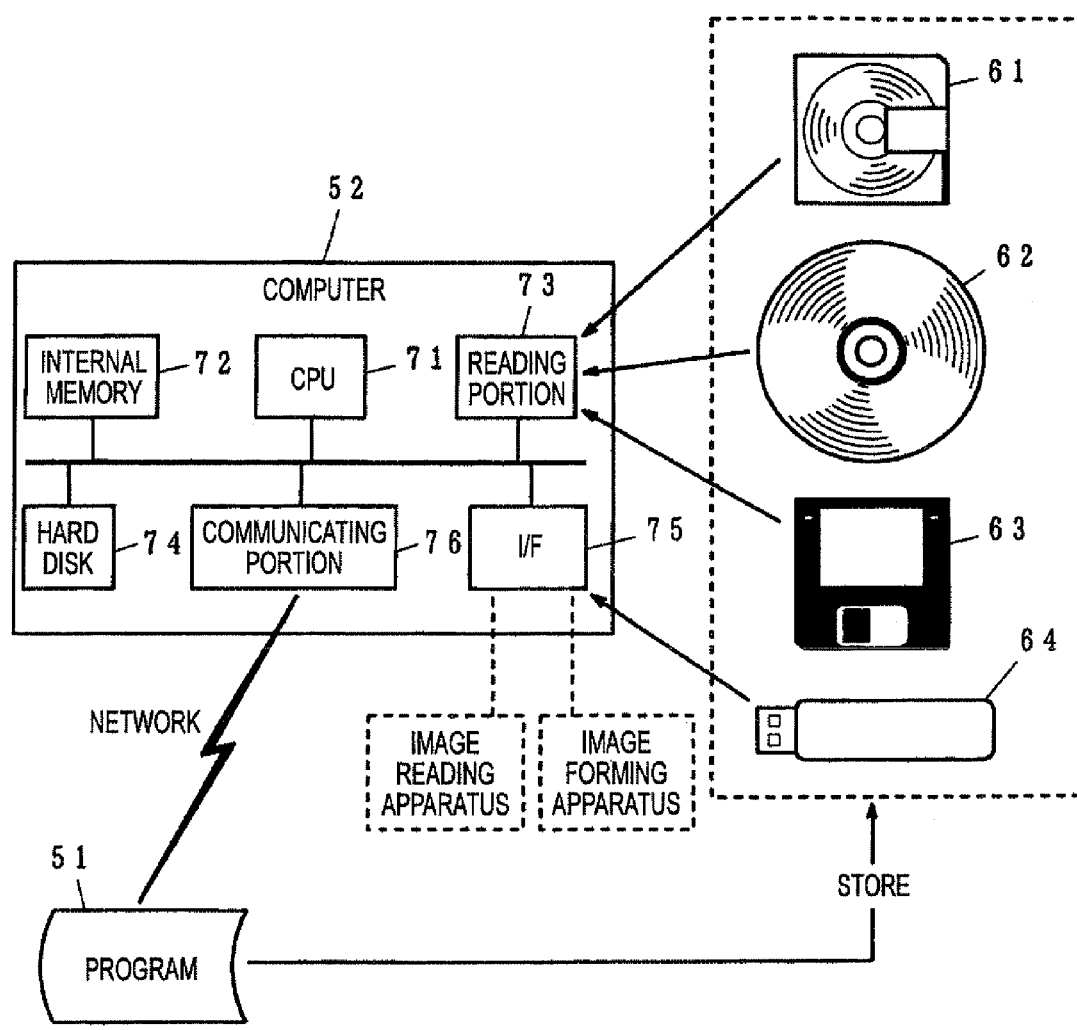
FIG. 12 is an explanatory diagram showing an example of a computer program, a storage medium storing the computer program and a computer in the case in which the function described in each of the exemplary embodiments according to the invention is implemented by the computer program.

FIG. 12 is an explanatory diagram showing an example of a computer program, a storage medium storing the computer program and a computer in the case in which the function described in each of the exemplary embodiments according to the invention is implemented by the computer program. In FIG. 12, 51 denotes a program, 52 denotes a computer, 61 denotes a magneto-optical disc, 62 denotes an optical disc, 63 denotes a magnetic disc, 64 denotes a memory, 71 denotes a CPU, 72 denotes an internal memory, 73 denotes a reading portion, 74 denotes a hard disk, 75 denotes an interface, and 76 denotes a communicating portion.

The function of each portion described in each of the exemplary embodiments according to the invention may be wholly or partially implemented by the program 51 which can be executed by the computer. In that case, it is preferable that the program 51 and data to be used by the program 51 should be stored in a computer readable storage medium. The storage medium serves to cause a changing state of an energy such as a magnetism, a light or an electricity corresponding to contents described in the program for the reading portion 73 provided in hardware resources of the computer and to transmit, to the reading portion 73, the contents described in the program in a signal format corresponding thereto. For example, the storage medium includes the magneto-optical disc 61, the optical disc 62 (containing a CD and a DVD), the magnetic disc 63, and the memory 64 (containing an IC card and a memory card). As a matter of course, the storage medium is not restricted to a portable type.

The program 51 is stored in the storage media and the storage media are attached to the reading portion 73 or the interface 75 in the computer 52 to read the program 51 from the computer 52, to store the program 51 in the internal memory 72 or the hard disk 74 and to execute the program 51 through the CPU 71, for example, so that the functions described in the respective exemplary embodiments according to the invention are implemented wholly or partially. Alternatively, it is also possible to implement the functions by transferring the program 51 to the computer 52 through a communication path, receiving the program 51 through the communicating portion 76 in the computer 52 and storing the program 51 in the internal memory 72 or the hard disk 74, and executing the program 51 through the CPU 71.

The computer 52 may be further connected to various devices through the interface 75. For example, it is also possible to connect display means for displaying information or receiving means for receiving information from a user. Moreover, it is also possible to employ a structure in which an image forming apparatus to be an output apparatus is connected through the interface 75 and an image subjected to a color limitation is formed by the image forming apparatus, for example. Alternatively, it is also possible to employ a structure in which an image reading apparatus is connected through the interface 75 and an image read by the image reading apparatus is set to be a processing target image, and a color limitation processing is thus carried out to reduce a data volume, and the data are stored in the hard disk 74 or are transmitted to an outside through the communicating portion 76. Alternatively, it is also possible to employ a structure in which the image reading apparatus and the image forming apparatus are connected to the interface 75 and a color limitation processing is carried out over an image read by the image reading apparatus, and an image is thus formed by the image forming apparatus.

As a matter of course, the apparatus can also be constituted by hardware partially or wholly. Alternatively, it is also possible to constitute a program including the functions described in the respective exemplary embodiments according to the invention wholly or partially together with the other structures. For example, it is also possible to constitute a single program together with a control program in an apparatus including the image reading apparatus or the image forming apparatus, for example, a copying machine or to constitute a single program together with a control program in the apparatus including the image forming apparatus such as a printer. As a matter of course, it is also possible to carry out an integration with a program in the other uses in case of an application to the uses.

What is claimed is:

1. An image processing apparatus comprising:
    a first calculating section that calculates a non-contour degree indicating a color difference between a pixel of a processing target image data and each of surrounding pixels, the non-contour degree being a greater absolute value of values calculated by a first differential filter,
    a second calculating section that calculates a thin line degree indicating a width of a line of the pixel of the processing target image data, the thin line degree being a greater absolute value of values calculated by a second differential filter,
    a region extracting section that extracts a region based on the non-contour degree and the thin line degree, and
    a first color value extracting section that extracts a color value within a range of a predetermined number of colors based on a color used in the region extracted by the region extracting section in the processing target image data.

2. An image processing apparatus comprising:
    a first calculating section that calculates a non-contour degree indicating a color difference between a pixel of a processing target image data and each of surrounding pixels, the non-contour degree being a greater absolute value of values calculated by a first differential filter,
    a second calculating section that calculates a thin line degree indicating a width of a line of the pixel of the processing target image data, the thin line degree being a greater absolute value of values calculated by a second differential filter,
    a weight calculating section that calculates a weight in a calculation of a frequency value based on the non-contour degree and the thin line degree, and
    a second color value extracting section that extracts a color value within a range of a predetermined number of colors based on a color frequency value subjected to weighting by the weight calculated by the weight calculating section for a color used in the processing target image data.

3. The image processing apparatus according to claim 1, further comprising:
    a smoothing section that keeps a contour for a processing target image data and carries out a smoothing processing, wherein
    at least the first calculating section and the second section calculate the non-contour degree and the thin line degree respectively from an image data subjected to the smoothing processing through the smoothing section.

4. The image processing apparatus according to claim 2, further comprising:
    a smoothing section that keeps a contour for a processing target image data and carries out a smoothing processing, wherein at least the first calculating section and the second section calculate the non-contour degree and the thin line degree respectively from an image data subjected to the smoothing processing through the smoothing section.

5. The image processing apparatus according to claim 3, wherein
    the color value extracting section extracts the color value from the image data subjected to the smoothing processing through the smoothing section.

6. The image processing apparatus according to claim 4, wherein
    the color value extracting section extracts the color value from the image data subjected to the smoothing processing through the smoothing section.

7. The image processing apparatus according to claim 1, further comprising:
    a color exchanging section that exchanges a color in the extracted region of the processing target image data with the color value extracted by the color value extracting section.

8. The image processing apparatus according to claim 2, further comprising:
    a color exchanging section that exchanges a color of the processing target image data into the color value extracted by the color value extracting section.

9. The image processing apparatus according to claim 3, further comprising:
    a color exchanging section that exchanges a color in the extracted region of the image data subjected to the smoothing processing through the smoothing section with the color value extracted by the color value extracting section.

10. The image processing apparatus according to claim 4, further comprising:
    a color exchanging section that exchanges a color of the image data subjected to the smoothing processing through the smoothing section into the color value extracted by the color value extracting section.

11. An image processing method comprising:
    calculating a non-contour degree indicating a color difference between a pixel of a processing target image data and each of surrounding pixels, the non-contour degree being a greater absolute value of values calculated by a first differential filter,
    calculating a thin line degree indicating a width of a line of the pixel of the processing target image data, the thin line degree being a greater absolute value of values calculated by a second differential filter,
    extracting a region based on the non-contour degree and the thin line degree, and
    extracting a color value within a range of a predetermined number of colors based on a color used in the region extracted by the extracting step in the processing target image data.

12. The image processing method according to claim 11, further comprising:
    keeping a contour for a processing target image data; and
    carrying out a smoothing processing, wherein
    the calculating steps calculate the non-contour degree and the thin line degree respectively from an image data subjected to the smoothing processing.

13. The image processing method according to claim 12, wherein
    the extracting step extracts the color value from the image data subjected to the smoothing processing.

14. A non-transitory computer readable medium storing a program causing a computer to execute a process for an image processing, the process comprising:
calculating a non-contour degree indicating a color difference between a pixel of a processing target image data and each of surrounding pixels, the non-contour degree being a greater absolute value of values calculated by a first differential filter,
calculating a thin line degree indicating a width of a line of the pixel of the processing target image data, the thin line degree being a greater absolute value of values calculated by a second differential filter,
extracting a region based on the non-contour degree and the thin line degree, and
extracting a color value within a range of a predetermined number of colors based on a color used in the region extracted by the extracting step in the processing target image data.

15. The computer readable medium according to claim 14, the process further comprising:
keeping a contour for a processing target image data; and
carrying out a smoothing processing, wherein
the calculating steps calculate the non-contour degree and the thin line degree respectively from an image data subjected to the smoothing processing.

16. The computer readable medium according to claim 15, wherein the extracting step extracts the color value from the image data subjected to the smoothing processing.

* * * * *